US010598310B2

(12) United States Patent
Hallar et al.

(10) Patent No.: US 10,598,310 B2
(45) Date of Patent: Mar. 24, 2020

(54) SYSTEMS AND METHODS FOR SINGLE HANDED OPERATION OF AN ADJUSTABLE STAND

(71) Applicant: Dell Products L.P., Round Rock, TX (US)

(72) Inventors: James Henry Hallar, Austin, TX (US); John Trevor Morrison, Round Rock, TX (US); Chiu-Jung Tsen, Zhubei (TW); Lawrence Stone, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 15/885,505

(22) Filed: Jan. 31, 2018

(65) Prior Publication Data

US 2019/0234553 A1 Aug. 1, 2019

(51) Int. Cl.
*F16M 11/18* (2006.01)
*F16M 11/10* (2006.01)

(52) U.S. Cl.
CPC ............ *F16M 11/18* (2013.01); *F16M 11/10* (2013.01); *F16M 2200/021* (2013.01)

(58) Field of Classification Search
CPC ... F16M 11/18; F16M 11/10; F16M 2200/021
USPC ...... 248/441.1, 442, 422.2, 433, 444, 444.1, 248/445, 446, 447.1, 447, 447.2, 448, 248/449, 450, 451, 452, 453, 454, 455, 248/456, 457, 458, 459, 460, 461, 462, 248/463, 464, 465
See application file for complete search history.

(56) References Cited

U.S. PATENT DOCUMENTS

| | | | | |
|---|---|---|---|---|
| 1,931,767 | A * | 10/1933 | Malcolm | B41J 29/15 226/127 |
| 3,332,399 | A * | 7/1967 | Patrick | B41J 29/15 248/441.1 |
| 8,387,938 | B2 * | 3/2013 | Lin | G06F 1/1632 248/397 |
| 2005/0253040 | A1 * | 11/2005 | Yang | F16M 11/10 248/688 |
| 2008/0283691 | A1 * | 11/2008 | Bliven | F16M 11/10 248/125.2 |
| 2012/0273644 | A1 * | 11/2012 | Lin | G06F 1/1632 248/397 |

* cited by examiner

*Primary Examiner* — Kimberly T Wood
(74) *Attorney, Agent, or Firm* — Baker Botts L.L.P.

(57) ABSTRACT

A disclosed adjustable stand may include a stand base, a stand cradle rotatably coupled to the stand base, and a handle rotatably coupled to the stand cradle. The adjustable stand, when the handle is rotated to an adjustment position and the stand cradle is rotated to a rotational position with respect to the stand base, may set an angle of the stand cradle with respect to the stand base to a selected angle. The adjustable stand, when the handle is rotated to a retention position, may lock the angle of the stand cradle to the selected angle.

20 Claims, 9 Drawing Sheets

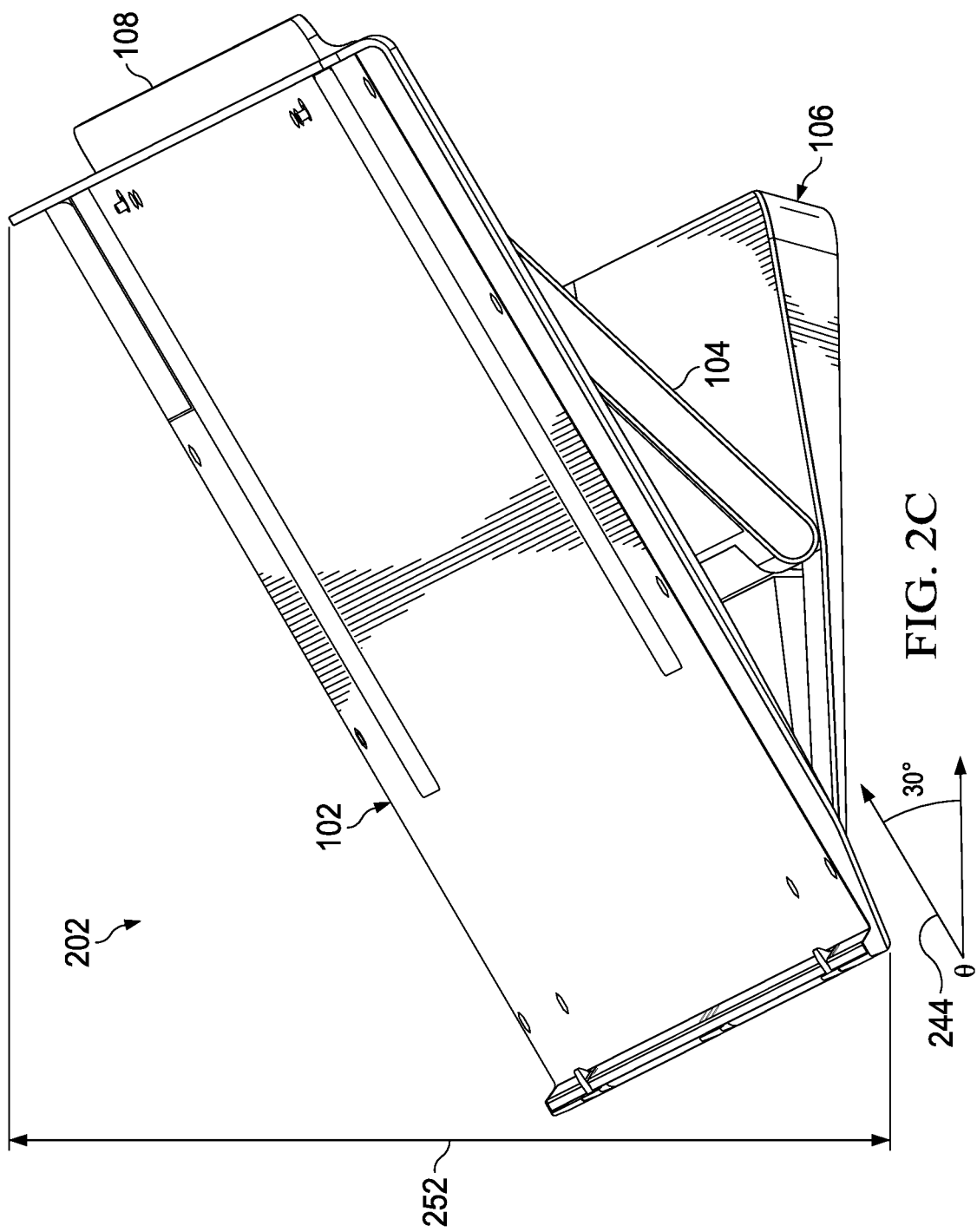

SYSTEMS AND METHODS FOR SINGLE HANDED OPERATION OF AN ADJUSTABLE STAND

BACKGROUND

Field of the Disclosure

This disclosure relates generally to adjustable stands and, more particularly, to single handed operation of an adjustable stand.

Description of the Related Art

Stands are being used by individuals for a variety of design, artistic, architectural tasks, and other types of tasks. Various stands are available to users such as adjustable stands, which may allow a user to adjust the position of the stand. However, these adjustable stands can be complicated to operate and adjust. For example, an adjustable stand may be moved to a desired position but this might not lock the stand in this desired position, which may cause the position of the stand to move while a user is working on their task. Typically, adjustable stands require both hands to operate and adjust the position of the stand, and require multiple parts of the stand to be disengaged in multiple steps while adjusting the position of the stand.

SUMMARY

In one embodiment, a disclosed adjustable stand may include a stand base, a stand cradle rotatably coupled to the stand base proximate a bottom edge of the stand cradle and a front edge of the stand base, and a stand arm rotatably coupled to the stand base proximate a bottom edge of the stand arm and a middle section of a top side of the stand base, and movably coupled to the stand cradle proximate two side edges of the stand cradle. The stand base may also include a handle rotatably coupled to the stand cradle proximate a top edge of the stand cradle and two sets of rack teeth, each set of rack teeth may be coupled to a back side of the stand cradle proximate a respective one of the two side edges of the stand cradle. The stand base may further include two rack tooth mechanisms, each rack tooth mechanism may include a locking-sliding mechanism having a set of teeth, each locking-sliding mechanism may be rotatably coupled to a respective one of two ends of the handle. The rack tooth mechanism may, when the handle is rotated to an adjustment position, cause each locking-sliding mechanism to rotate to an unlocked position and each set of teeth to disengage from a respective one of the two sets of rack teeth. The rack tooth mechanism may also, when the handle is in the adjustment position and the stand cradle is rotated to a first rotational position with respect to the stand base, set an angle of the stand cradle with respect to the stand base to a selected one of a plurality of angles at which the stand cradle can be set. The rack tooth mechanism may further, when the handle is rotated to a retention position, cause each locking-sliding mechanism to rotate to a locked position, each set of teeth to engage with a portion of the respective one of the two sets of rack teeth, and lock the angle of the stand cradle to the selected angle.

In a number of the disclosed embodiments of the adjustable stand, each locking-sliding mechanism may be rotatably coupled to the respective one of the two ends of the handle by a cam rod of a respective one of the two rack tooth mechanisms.

In a number of the disclosed embodiments of the adjustable stand, each locking-sliding mechanism may be rotatably coupled to the respective one of the two ends of the handle by a rotational direction transfer mechanism of a respective one of the two rack tooth mechanisms, each rotational direction transfer mechanism may transfer rotations of the handle in a first plane to rotations of the respective locking-sliding mechanism in a second plane perpendicular to the first plane.

In a number of the disclosed embodiments of the adjustable stand, each rotational direction transfer mechanism may be rotatably coupled to the respective one of the locking-sliding mechanisms and the respective one of the two ends of the handle by a coil spring of the rotational direction transfer mechanism. When the handle is released, the coil spring may cause the handle to rotate back to the retention position.

In a number of the disclosed embodiments of the adjustable stand, each rotational direction transfer mechanism may include a first beveled gear and a second beveled gear rotatably coupled to the first beveled gear. Each rotational direction transfer mechanism may transfer rotations of the handle in the first plane by the respective first beveled gear to rotations of the respective one of the locking-sliding mechanisms in the second plane by the respective second beveled gear.

In a number of the disclosed embodiments of the adjustable stand, the stand cradle may be rotatably coupled to the stand base by a first hinge proximate a bottom edge of the stand cradle. When the stand cradle is rotated to the first rotational position, the stand cradle may pivot around the first hinge.

In a number of the disclosed embodiments of the adjustable stand, the stand arm may be rotatably coupled to the stand base by a second hinge proximate a bottom edge of the stand arm. When the stand cradle is rotated to the first rotational position, the stand arm may pivot around the second hinge.

In a number of the disclosed embodiments of the adjustable stand, the second hinge may include a coil spring to create a rotational tension force in an upward rotational direction. When the angle of the stand cradle is being increased, the rotational tension force in the upward rotational direction may reduce a load on the stand cradle.

In a number of the disclosed embodiments of the adjustable stand, the adjustable stand may further include two slots, each slot may be coupled to the back side of the stand cradle proximate a respective one of the two sets of rack teeth. The stand arm may be movably coupled to the two slots proximate a top edge of the stand arm. When the stand cradle is rotated to the first rotational position, the top edge of the stand arm may move in the two slots in a linear direction parallel to the back side of table stand.

In a number of the disclosed embodiments of the adjustable stand, when the stand cradle is rotated in an upward rotational direction, the linear direction of the top edge of the stand arm may be an upward linear direction.

In a number of the disclosed embodiments of the adjustable stand, when the stand cradle is rotated in a downward rotational direction, the linear direction of the top edge of the stand arm may be a downward linear direction.

In a number of the disclosed embodiments of the adjustable stand, each set of rack teeth may include a first set of angled teeth at a first angle and a second set of angled teeth at a second angle opposite the first angle. The set of teeth of each locking-sliding mechanism may include a third set of angled teeth at the second angle and a fourth set of angled teeth at the first angle. When the handle is rotated to the retention position each third set of angled teeth may engage with a portion of the first set of angled teeth of a respective one of the two sets of rack teeth and each fourth set of angled teeth may engage with a portion of the second set of angled teeth of a respective one of the two sets of rack teeth.

In a number of the disclosed embodiments of the adjustable stand, when the stand cradle is rotated in a downward rotational direction, the angle of the stand cradle with respect to the stand base may be decreased.

In a number of the disclosed embodiments of the adjustable stand, when the stand cradle is rotated in an upward rotational direction, the angle of the stand cradle with respect to the stand base may be increased.

In a number of the disclosed embodiments of the adjustable stand, the plurality of angles may range from a 0 degree angle to a 90 degree angle.

In a number of the disclosed embodiments of the adjustable stand, the plurality of angles may vary by a fixed increment that is dependent on the pitch of the two sets of rack teeth.

In a second embodiment, a disclosed adjustable stand may include a stand base, a stand cradle rotatably coupled to the stand base proximate a bottom edge of the stand cradle and a front edge of the stand base, a stand arm rotatably coupled to the stand base proximate a bottom edge of the stand arm and a middle section of a top side of the stand base, and movably coupled to the stand cradle proximate two side edges of the stand cradle, a handle rotatably coupled to the stand cradle proximate a top edge of the stand cradle, a first set of rack teeth coupled to a back side of the stand cradle proximate a first side edge of the stand cradle, a first locking-sliding mechanism including a first set of teeth, and a first cam rod coupled to the first locking-sliding mechanism and rotatably coupled to a first end of the handle. The first cam rod, when the handle is rotated to an adjustment position, may rotate to an unlocked position and may cause the first set of teeth to disengage from the first set of rack teeth. The first cam rod, when the handle is in the adjustment position and the stand cradle is forced in a rotational direction with respect to the stand base, may set an angle of the stand cradle to a selected one of a plurality of angles at which the stand cradle can be set. The first cam rod, when the handle is rotated to a retention position, may rotate to a locked position and may cause the first set of teeth to engage with a portion of the first set of rack teeth to lock the angle of the stand cradle to the selected angle.

In a number of the disclosed embodiments of the adjustable stand, the adjustable stand may also include a second set of rack teeth coupled to the back side of the stand cradle proximate a second side edge of the stand cradle, a second locking-sliding mechanism including a second set of teeth, and a second cam rod coupled to the second locking-sliding mechanism and rotatably coupled to a second end of the handle opposite the first end. The second cam rod, when the handle is rotated to a retention position, may rotate to a locked position and may cause the second set of teeth to engage with a portion of the second set of rack teeth to lock the angle of the stand cradle to the selected angle.

In a number of the disclosed embodiments of the adjustable stand, the first cam rod may be rotatably coupled to the first end of the handle by a first rotational direction transfer mechanism of the first rack tooth mechanism. The first rotational direction transfer mechanism may transfer rotations of the handle in a first plane to rotations of the first cam rod in a second plane perpendicular to the first plane.

In a number of the disclosed embodiments of the adjustable stand, the first rotational direction transfer mechanism may be rotatably coupled to the first cam rod and the first end of the handle by a coil spring of the rotational direction transfer mechanism. When the handle is released, the coil spring may cause the handle to rotate back to the retention position.

BRIEF DESCRIPTION OF THE DRAWINGS

For a more complete understanding of the present invention and its features and advantages, reference is now made to the following description, taken in conjunction with the accompanying drawings, in which:

FIGS. 2A, 2B, 2C, and 2D are side views including selected elements of embodiments of adjustable stands in various positions;

DESCRIPTION OF PARTICULAR EMBODIMENT(S)

Figure 1:
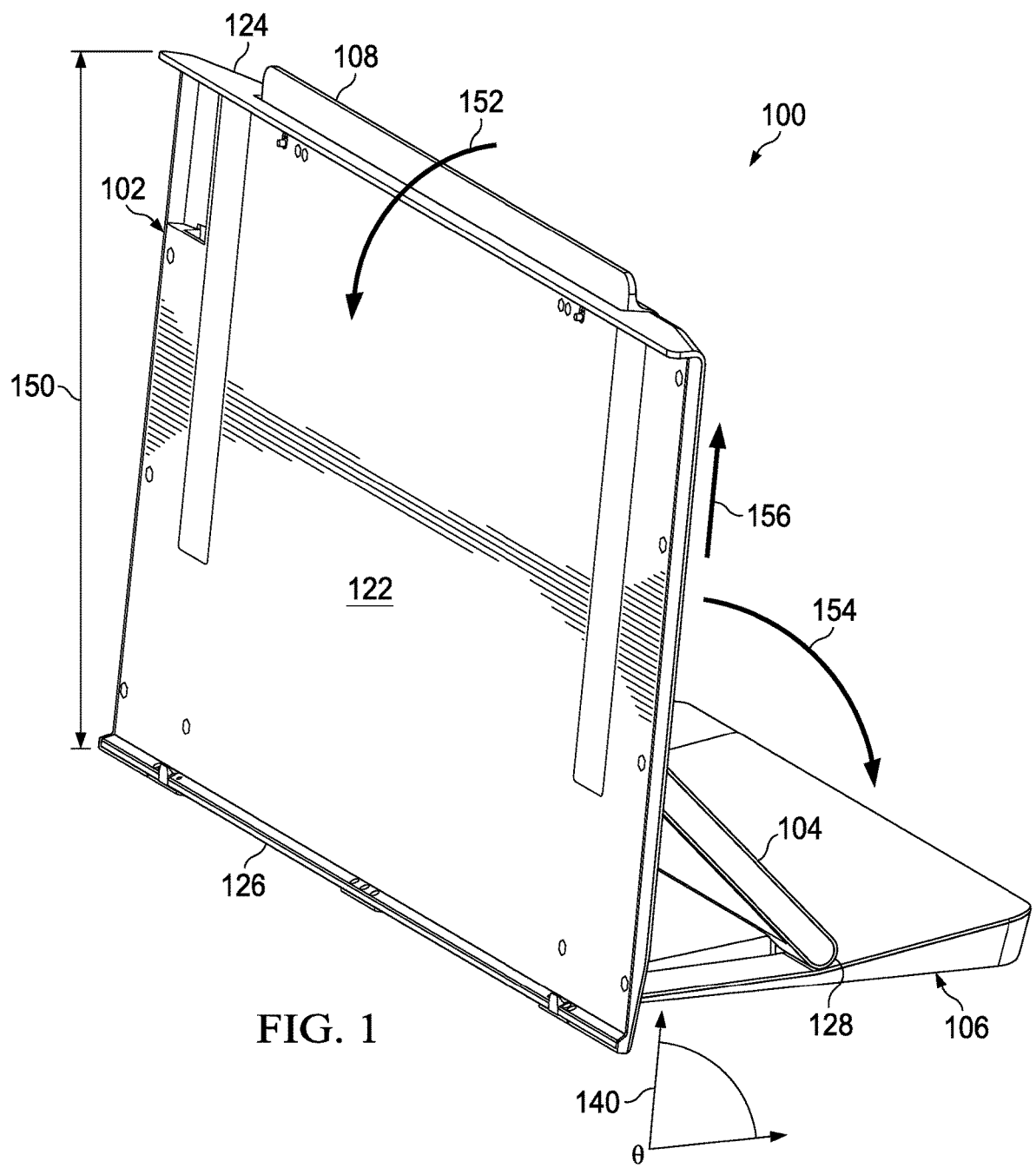
FIG. 1 is a front three quarter view including selected elements of an embodiment of an adjustable stand.

In the following description, details are set forth by way of example to facilitate discussion of the disclosed subject matter. It should be apparent to a person of ordinary skill in the field, however, that the disclosed embodiments and all the details and descriptions associated therewith are exemplary and not exhaustive of all possible embodiments and are not meant to limit the scope of the invention which scope is solely defined by the appended claims.

As used herein, a hyphenated form of a reference numeral refers to a specific instance of an element and the unhyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, adjustable stands may allow a user to adjust the position of the stand. However, these adjustable stands can be complicated to operate and adjust. For example, an adjustable stand may be moved to a desired position but this might not lock the stand in this desired position, which may cause the position of the stand to move while a user is working on their task. Typically, adjustable stands require both hands to operate and adjust the position of the stand, and require multiple parts of the stand to be disengaged in multiple steps while adjusting the position of the stand. As described in more detail below, an adjustable stand may include a stand cradle, a stand base, and an adjustment and locking mechanism. The adjustable stand may be designed to improve the usability as the adjustment and locking mechanism transitions between adjustment and locked positions and the stand cradle is rotated to a selected angle of the stand cradle with respect to the stand base with one handed operation, while maintaining stability of the stand.

Particular embodiments are best understood by reference to FIGS. 1-6 wherein like numbers are used to indicate like and respective parts.

Turning now to the drawings, FIG. 1 illustrates a front three quarter view including selected elements of an adjustable stand 100 including a stand cradle 102, a stand arm 104, a stand base 106, and a handle 108. Stand cradle 102 may include a front side 122, a top edge 124, and a bottom edge 126. Stand arm 104 may include a top edge (not shown) and a bottom edge 128 opposite the top edge of stand arm 104. Stand cradle 102 may be rotatably coupled to stand base 106 proximate bottom edge 126 of stand cradle 102 such that stand cradle 102 may rotate relative to stand base 106. Stand arm 104 may be movably coupled to stand cradle 102 proximate the top edge of stand arm 104 such that the top edge of stand arm 104 may move relative to stand cradle 102 in a linear direction parallel to stand cradle 102 and between top edge 124 and bottom edge 126 of stand cradle 102. Bottom edge 128 of stand arm 104 may be rotatably coupled to stand base 106 so that stand arm 104 may rotate relative to stand base 106. Handle 108 may be rotatably coupled to stand cradle 102 proximate top edge 124 of stand cradle 102 such that handle 108 may rotate from a retention position to an adjustment position. Handle 108 may also rotate from an adjustment position to a retention position. More specifically, a rotational force may be applied to handle 108 in a rotational direction 152 to rotate handle 108 to the adjustment position. A user may operate handle 108 by applying a rotational force with a single hand. When handle 108 is in the adjustment position, a rotational force may be applied to stand cradle 102 in a rotational direction 154, which may cause top edge 124 of stand cradle 102 to rotate in rotational direction 154, the top edge of the stand arm 104 to move in a linear direction 156, and the position of stand cradle 102 to be adjusted, setting the angle 140 of stand cradle 102 to a selected one of a plurality of angles at which stand cradle 102 can be set. When handle 108 is in the adjustment position, a rotational force may be applied to stand cradle 102 in a rotational direction opposite rotational direction 154, which may cause top edge 124 of stand cradle 102 to rotate in the rotational direction opposite rotational direction 154, the top edge of the stand arm 104 to move in a linear direction opposite linear direction 156, and the position of stand cradle 102 to be adjusted, setting the angle 140 of stand cradle 102 to a selected one of a plurality of angles at which stand cradle 102 can be set. Another rotational force may be applied to handle 108 in another rotational direction opposite rotational direction 152 to rotate handle 108 back to the retention position, which may prevent rotation of top edge 124 of stand cradle 102, prevent movement of the top edge of the stand arm 104, and lock stand cradle 102 in the adjusted position. When stand cradle 102 is locked in the adjusted position, angle 140 of stand cradle 102 may be locked at the selected angle and the height 150 of stand cradle 102 may be locked at a height corresponding to the selected angle. Angle 140 may be measured as the angle between a plane of stand cradle 102 when stand cradle 102 is locked in the adjusted position and a plane of stand base 106. Height 150 may be measured as the distance between a co-planar line at top edge 124 of stand cradle 102 and a co-planar line at bottom edge 126 of stand cradle 102 parallel to the co-planar line at top edge 124.

In one or more embodiments, when handle 108 is in the adjustment position and the rotational direction of stand cradle 102 is in an upward rotational direction, the linear direction of the top edge of stand arm 104 may be in an upward linear direction. When handle 108 is in the adjustment position and the rotational direction of stand cradle 102 is in a downward rotational direction, the linear direction of the top edge of stand arm 104 may be in a downward linear direction.

In one or more embodiments, when handle 108 is in the adjustment position and the rotational direction of stand cradle 102 is in an upward rotational direction, the angle 140 of the stand cradle 102 may be increased. When handle 108 is in the adjustment position and the rotational direction of stand cradle 102 is in a downward rotational direction, the angle 140 of the stand cradle 102 may be decreased.

Figure 2A:
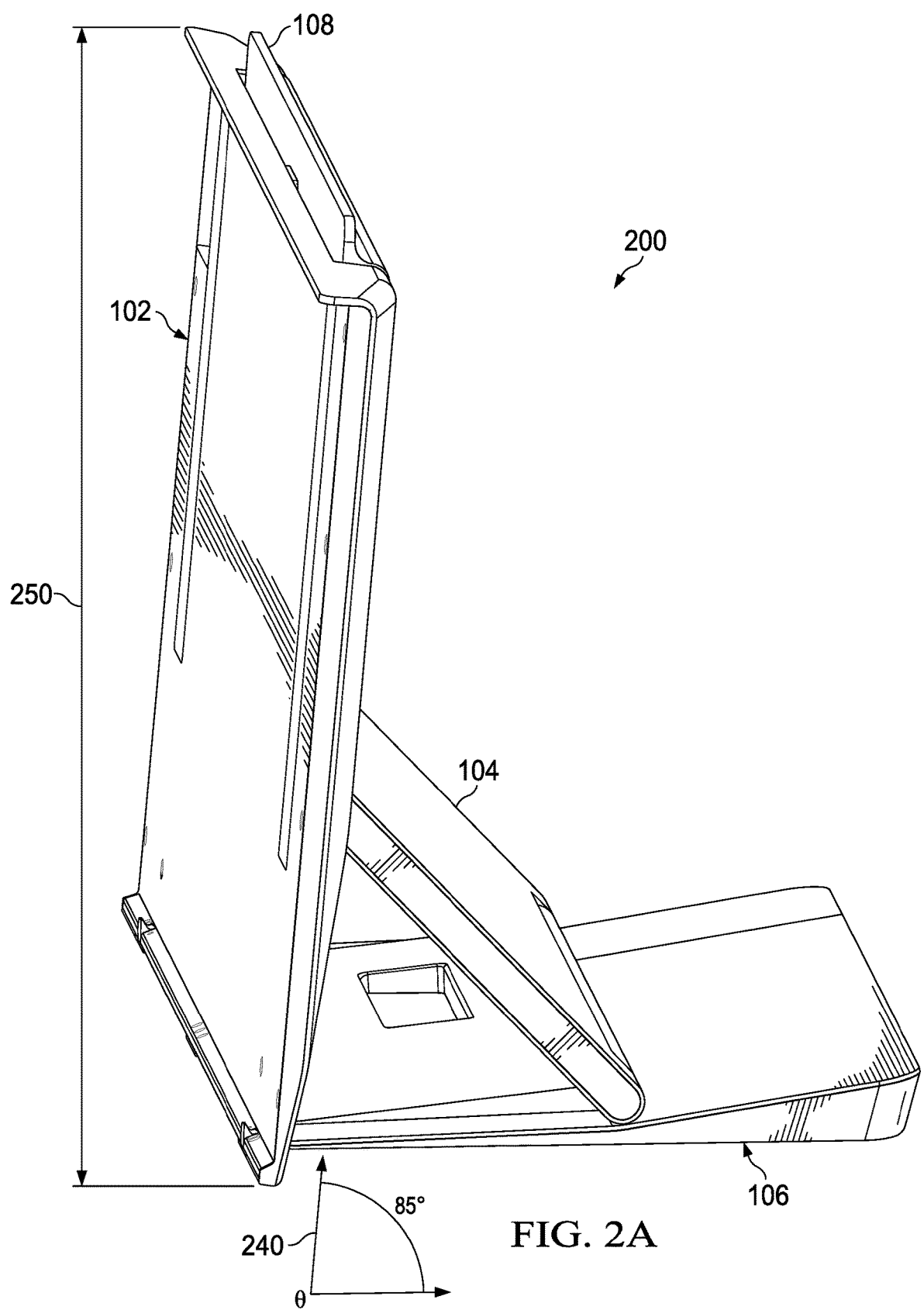
Figure 2B:
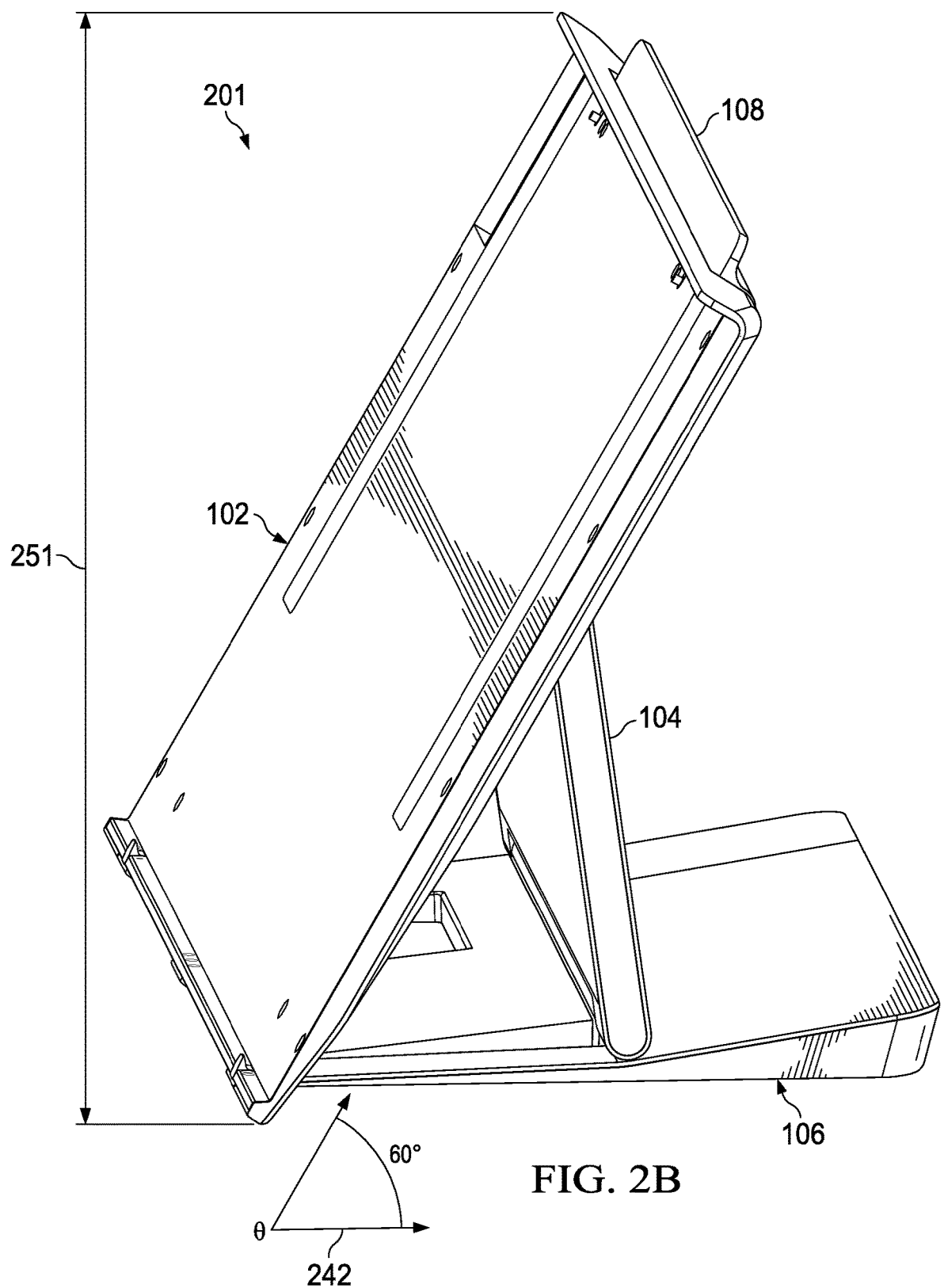
Figure 2D:
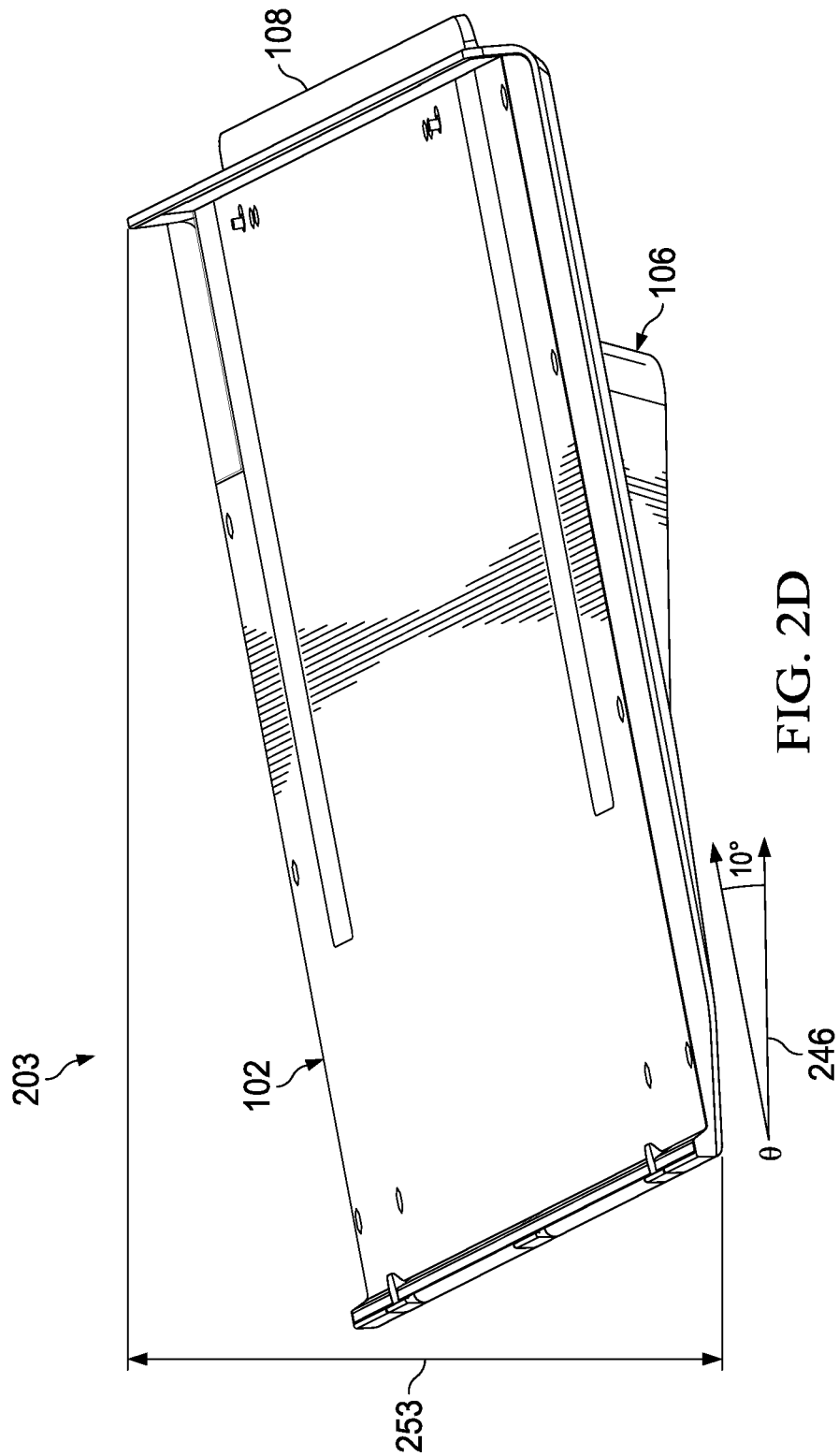

FIGS. 2A, 2B, 2C, and 2D illustrate side views including selected elements of embodiments of adjustable stands in various positions. In FIGS. 2A, 2B, 2C, and 2D, each adjustable stand 200, 201, 202, and 203 may include one or more components of adjustable stand 100, as previously described with reference to FIG. 1. For example, in FIG. 2A, adjustable stand 200 is shown in a first working position with angle 240 of stand cradle 102 locked at an 85 degree angle. The first working position is an upright, near vertical, working position relative to a user. The height of top edge 124 corresponding to angle 240 is shown as height 250. In FIG. 2B, adjustable stand 201 is shown in a second working position, which is lower than the first working position illustrated in FIG. 2A. In this example, angle 242 of stand cradle 102 is locked at a 60 degree angle and corresponding height 251. In FIG. 2C, adjustable stand 202 is shown in a third working position that is lower than the second working position. In this example, angle 244 of stand cradle 102 is locked at a 30 degree angle and corresponding height 252. In FIG. 2D, adjustable stand 203 is shown in a fourth working position with angle 246 of stand cradle 102 locked at a 10 degree angle. The fourth working position is a near horizontal working position relative to a user. In one or more embodiments, the angle at which the stand cradle is set may be selectable from a plurality of angles that range from 0 degrees to 90 degrees. In some embodiments, the angles at which the stand cradle can be set may vary in increments of 1 degree or less.

Figure 3:
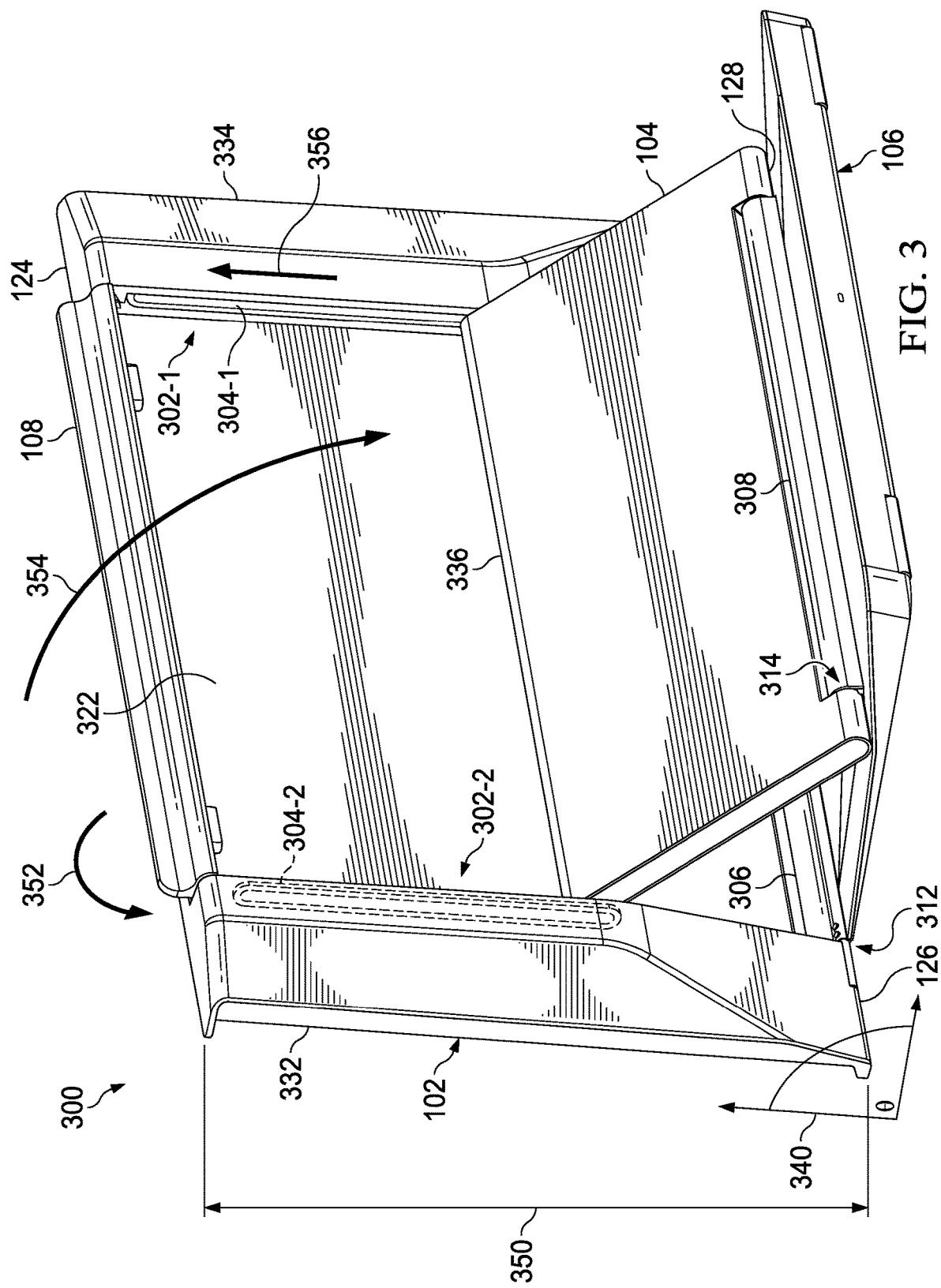
FIG. 3 is a rear three quarter view including selected elements of an embodiment of an adjustable stand.

FIG. 3 illustrates a rear three quarter view of selected elements of an embodiment of an adjustable stand 300. Adjustable stand 300 may include one or more components of adjustable stand 100, as previously described with reference to FIG. 1. Adjustable stand 300 may also include two rack tooth mechanisms 302 including rack tooth mechanisms 302-1 and 302-2, each rack tooth mechanism 302 proximate back side 322 of stand cradle 102 and a respective one of side edges 332 and 334 of stand cradle 102. Each rack tooth mechanism 302 may be rotatably coupled to a respective one of the two ends of handle 108. Adjustable stand 300 may further include two slots 304, each slot 304 may be coupled to back side 322 of stand cradle 102 proximate a respective one of the two rack tooth mechanisms 302. Stand arm 104 may be movably coupled to stand cradle 102 within the two slots 304. When a rotational force is applied to stand cradle 102 in a rotational direction 354, top edge 336 of stand arm 104 may move in the two slots 304 in a linear direction 356 parallel to back side 322 of stand cradle 102. When a rotational force is applied to stand cradle 102 in another rotational direction opposite rotational direction 354, top edge 336 of stand arm 104 may move in the two slots 304 in another linear direction opposite linear direction 356 parallel to back side 322 of stand cradle 102. Stand cradle 102 may be rotatably coupled to stand base 106 by a hinge 306 proximate bottom edge 126 of stand cradle 102. When a rotational force is applied to stand cradle 102 in a rotational direction 354, stand cradle 102 may pivot around hinge 306 at pivot point 312 in the rotational direction 354. When a rotational force is applied to stand cradle 102 in another rotational direction opposite rotational direction 354, stand cradle 102 may pivot around hinge 306 at pivot point 312 in the opposite rotational direction of rotational direction 354.

Stand arm 104 may be rotatably coupled to stand base 106 by a hinge 308 proximate bottom edge 128 of stand arm 104. When a rotational force is applied to stand cradle 102 in rotational direction 354, stand arm 104 may pivot around hinge 308 at pivot point 314 in the rotational direction 354. When a rotational force is applied to stand cradle 102 in another rotational direction opposite rotational direction 354, stand arm 104 may pivot around hinge 308 at pivot point 314 in the opposite rotational direction of rotational direction 354. In one or more embodiments, hinge 308 may include a coil spring that may create a rotational tension force in an upward rotational direction. When an angle 340 of stand cradle 102 is being increased, the rotational tension force in the upward rotational direction created by the coil spring may reduce a load on stand cradle 102. For example, in some embodiments, a portable information handling system may be mounted in stand cradle 102 and the coil spring may operate to reduce the load of the portable information handling system on stand cradle 102. For the purposes of this disclosure, a portable information handling system may be a personal computer, a tablet device, a consumer electronic device, or another suitable device and may vary in size, shape, performance, functionality, and price. In other embodiments, another type of load may be mounted in stand cradle 102, such as a type of artistic media.

In operation, a first rotational force may be applied to handle 108 in a rotational direction 352, which may cause handle 108 to rotate to an adjustment position. While handle 108 is in the adjustment position, a rotational force may be applied to stand cradle 102 in a rotational direction 354, which may cause top edge 124 of stand cradle 102 to pivot around hinge 306 at pivot point 312 in the rotational direction 354, top edge 336 of stand arm 104 to move within slots 304 in a linear direction 356, bottom edge 128 of stand arm 104 to pivot around hinge 308 at pivot point 314 in the rotational direction 354, and the position of stand cradle 102 to be adjusted, setting the angle 340 of stand cradle 102 in the adjusted position to a selected one of a plurality of angles at which stand cradle 102 can be set. Another rotational force may be applied to handle 108 in another rotational direction opposite rotational direction 354 to rotate handle 108 back to the retention position, which may cause stand cradle 102 to lock in the adjusted position. When stand cradle 102 is locked in the adjusted position, angle 140 of stand cradle 102 may be locked at the selected angle and the height 350 of stand cradle 102 may be locked at a height corresponding to the selected angle.

Figure 4A:
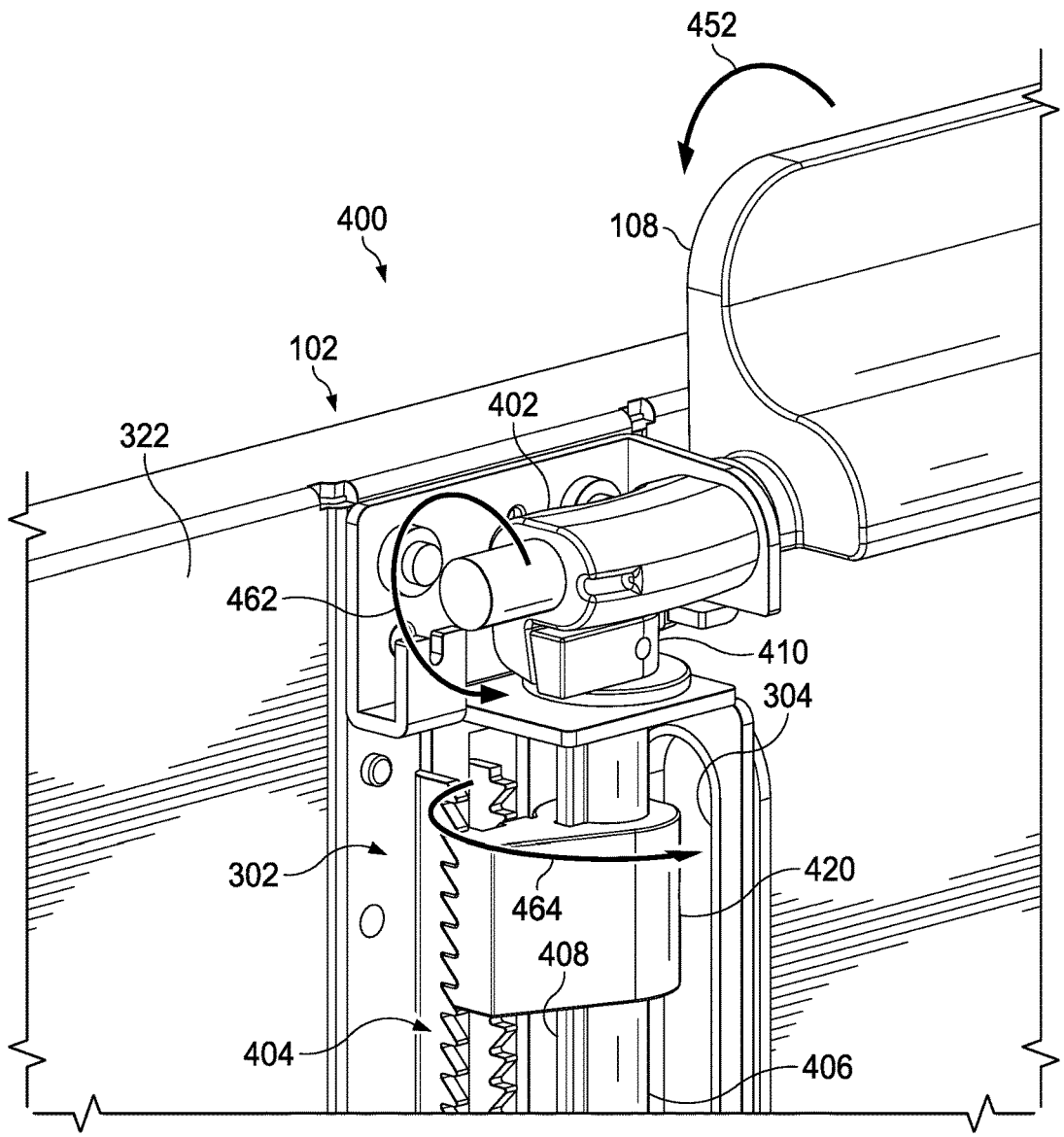
FIG. 4A illustrates selected elements of an embodiment of an adjustable stand including a portion of a handle, a rack tooth mechanism, and a locking-sliding mechanism.
Figure 4B:
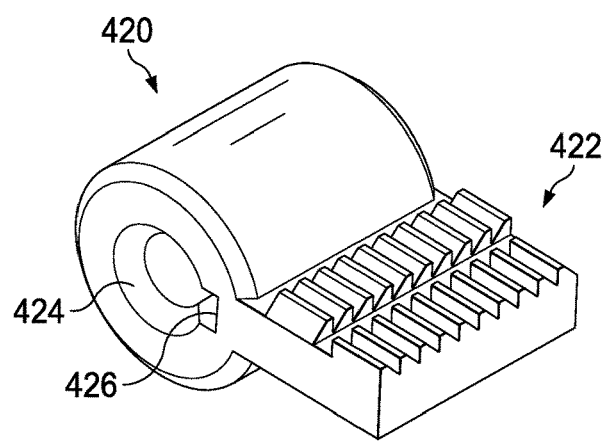
FIG. 4B illustrates selected elements of an embodiment of a locking-sliding mechanism.

FIG. 4A illustrates selected elements of an embodiment of an adjustable stand 400, which may include one or more components of adjustable stand 100, previously described with reference to FIG. 1, or adjustable stand 300, previously described with reference to FIG. 3. FIG. 4B illustrates selected elements of an embodiment of a locking-sliding mechanism 420. Adjustable stand 400 may include handle 108, rack tooth mechanism 302 including locking-sliding mechanism 420 of FIG. 4B, slot 304, a rotational direction transfer mechanism 402 having a cam rod coupling 410, a set of rack teeth including dual angled rack teeth 404, and a cam rod 406 having a protrusion 408. The set of rack teeth may be coupled to back side 322 of stand cradle 102 proximate rack tooth mechanism 302. Rotational direction transfer mechanism 402 may be rotatably coupled to one end of handle 108 and rotatably coupled to cam rod 406. Rotational direction transfer mechanism 402 may transfer rotations of handle 108 in a first plane to rotations of locking-sliding mechanism 420 in a second plane perpendicular to the first plane. Locking-sliding mechanism 420 may include a set of teeth including dual angled teeth 422, a cylindrical opening 424, and a guide notch 426. Locking-sliding mechanism 420 may be movably coupled to cam rod 406 by cylindrical opening 424 coupled to cam rod 406 and guide notch 426 coupled to protrusion 408, which may allow locking-sliding mechanism 420 to move along a linear direction parallel to cam rod 406 in either an upward or a downward direction. Protrusion 408 of cam rod 406 and guide notch 426 of locking-sliding mechanism 420 may allow locking-sliding mechanism 420 to rotate when cam rod 406 rotates.

Dual angled rack teeth 404 of rotational direction transfer mechanism 402 may include a first set of angled teeth at a first angle and a second set of angled teeth at a second angle opposite the first angle. Dual angled teeth 422 of locking-sliding mechanism 420 may include a third set of angled teeth at the second angle and a fourth set of angled teeth at the first angle. The third set of angled teeth may engage with a portion of the first set of angled teeth and the fourth set of angled teeth may engage with a portion of the second set of angled teeth.

Rotational direction transfer mechanism 402, when a rotational force is applied to handle 108 in a rotational direction 452, may rotate in a rotational direction 462 to an adjustment position, which may cause locking-sliding mechanism 420 to rotate in a rotational direction 464 and dual angled teeth 422 to disengage from dual angled rack teeth 404. Rotational direction transfer mechanism 402, when handle 108 is in the adjustment position and stand cradle 102 is forced in a second rotational direction, may set an angle of stand cradle 102 to a selected angle of a plurality of angles at which the angle of stand cradle 102 can be set. Rack tooth mechanism 302 may, when handle 108 is rotated to a retention position, cause locking-sliding mechanism 420 to rotate in another rotational direction opposite rotational direction 464, dual angled teeth 422 to engage with a portion of dual angled rack teeth 404, and the angle of stand cradle 102 to be locked to the selected angle.

In one or more embodiments, rotational direction transfer mechanism 402 may also be rotatably coupled to cam rod 406 and the end of handle 108 by cam rod coupling 410. Cam rod coupling 410 may be or include a coil spring. When handle 108 is released, for example, the coil spring may cause handle 108 to rotate back to the retention position even if a rotational force is not applied to handle 108.

Figure 5:
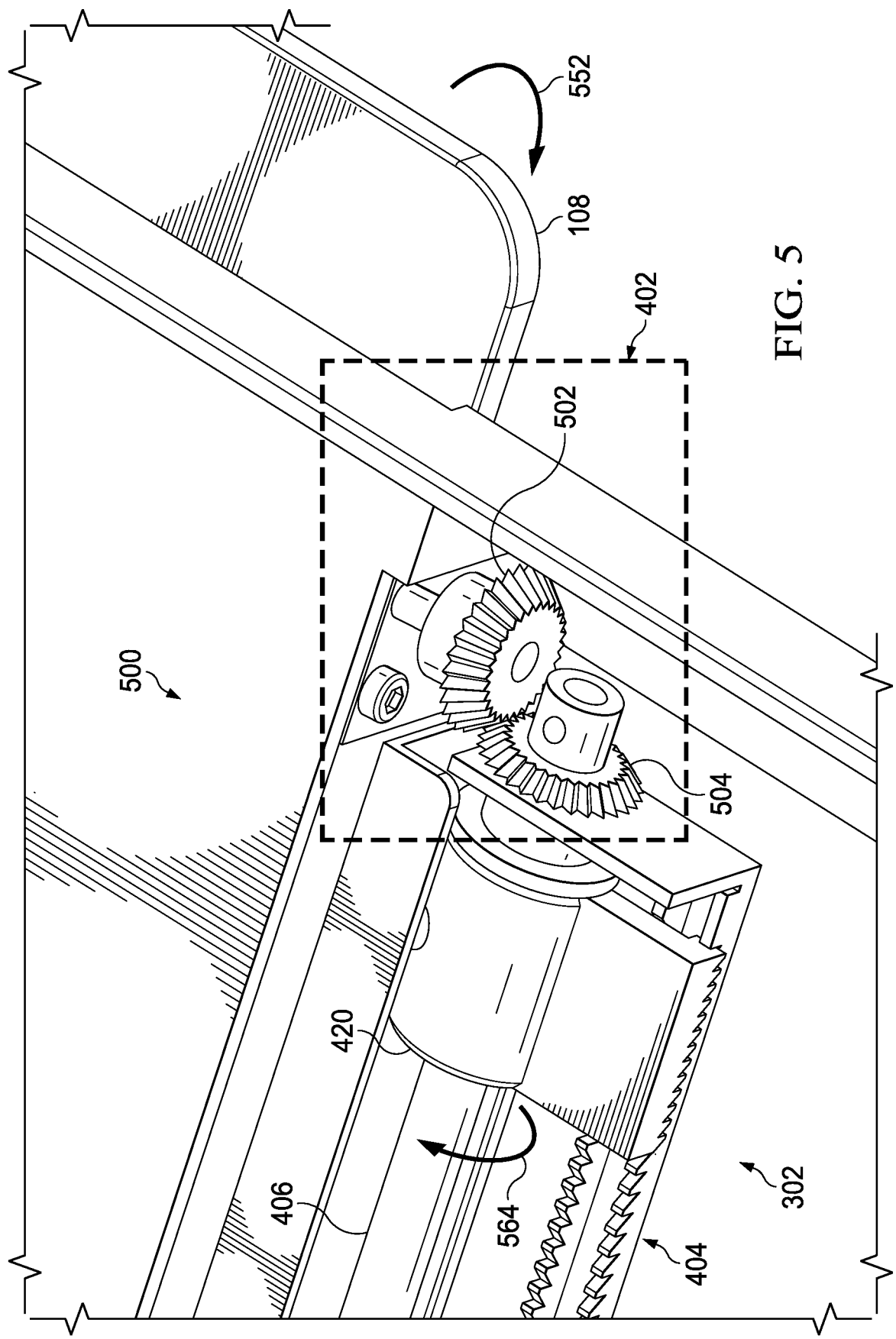
FIG. 5 illustrates selected elements of an embodiment of an adjustable stand including a portion of a handle, a rack tooth mechanism, and a beveled gear mechanism.

FIG. 5 illustrates selected elements of an embodiment of an adjustable stand 500 which may include one or more components of adjustable stand 400 described above with reference to FIGS. 4A and 4B. Adjustable stand 500 may include handle 108, rack tooth mechanism 302, rotational direction transfer mechanism 402, dual angled rack teeth 404, cam rod 406, and locking-sliding mechanism 420. In this example embodiment, rotational direction transfer mechanism 402 may include a beveled gear 502 and a beveled gear 504 rotatably coupled to beveled gear 502. Rotational direction transfer mechanism 402 may transfer rotations of handle 108 in a first plane by beveled gear 502 to rotations of cam rod 406 in the second plane by beveled gear 504. For example, when handle 108 is forced in a rotational direction 552, rotational direction transfer mechanism 402 may transfer a rotation of handle 108 in the rotational direction 552 by beveled gear 502 to rotations of cam rod 406 in a rotational direction 564 by beveled gear 504.

Figure 6:
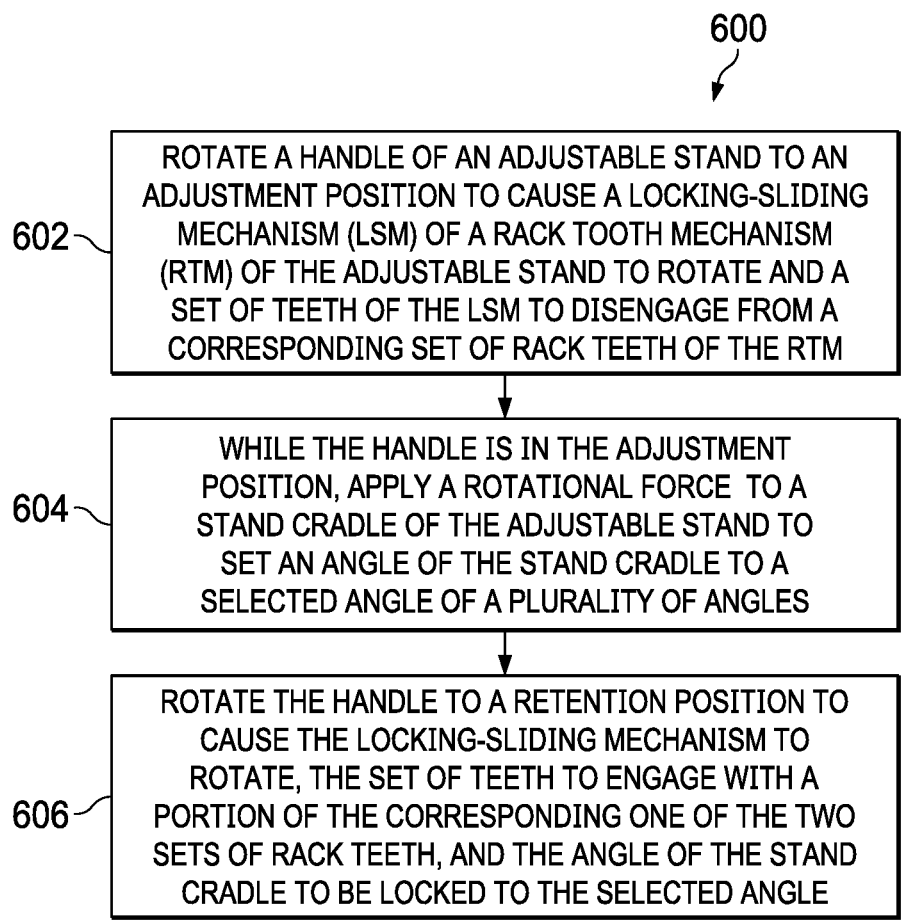
FIG. 6 is flowchart depicting selected elements of an embodiment of a method for single handed operation of an adjustable stand.

FIG. 6 is flowchart depicting selected elements of an embodiment of a method for single handed operation of an adjustable stand. The steps of method 600 may be performed to operate an adjustable stand that includes a stand cradle having a handle with single-handed actuation and at least one rack tooth mechanism coupled to the stand cradle and to the handle at (or near) a respective end of the handle. Each rack tooth mechanism may include dual rows of angled rack teeth, a cam rod coupled to the handle, and a locking-sliding mechanism coupled to the cam rod. Each locking-sliding mechanism may have dual rows of angled teeth. The adjustable stand may also include a stand arm coupled to the locking-sliding mechanisms. It is noted that certain operations described in method 600 may be optional or may be rearranged in different embodiments.

Method 600 may begin at step 602, by rotating the handle to an adjustment position by a single hand, causing a locking-sliding mechanism of a rack tooth mechanism of the adjustable stand to rotate to an unlocked position and a set of teeth of the locking-sliding mechanism to disengage from a corresponding set of rack teeth of the rack tooth mechanism. At step 604, while the handle is in the adjustment position, the method may include applying a rotational force to a stand cradle of the adjustable stand to set an angle of the stand cradle to a selected angle of a plurality of angles at which the stand cradle can be set. At step 606, the method may include rotating the handle to a retention position to cause the locking-sliding mechanism to rotate, the set of teeth to engage with a portion of the corresponding one of the two sets of rack teeth, and the angle of the stand cradle to be locked to the selected angle.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An adjustable stand, comprising:
    a stand base;
    a stand cradle rotatably coupled to the stand base proximate a bottom edge of the stand cradle and a front edge of the stand base;
    a stand arm rotatably coupled to the stand base proximate a bottom edge of the stand arm and a middle section of a top side of the stand base, and movably coupled to the stand cradle proximate two side edges of the stand cradle;
    a handle rotatably coupled to the stand cradle proximate a top edge of the stand cradle;
    two sets of rack teeth, each set of rack teeth coupled to a back side of the stand cradle proximate a respective one of the two side edges of the stand cradle; and
    two rack tooth mechanisms, each rack tooth mechanism including a locking-sliding mechanism having a set of teeth, each locking-sliding mechanism rotatably coupled to a respective one of two ends of the handle, the rack tooth mechanism configured to:
        when the handle is rotated to an adjustment position, cause each locking-sliding mechanism to rotate to an unlocked position and each set of teeth of the locking-sliding mechanism to disengage from a respective one of the two sets of rack teeth;
        when the handle is in the adjustment position and the stand cradle is rotated to a first rotational position with respect to the stand base, set an angle of the stand cradle with respect to the stand base to a selected one of a plurality of angles at which the stand cradle can be set; and
        when the handle is rotated to a retention position, cause each locking-sliding mechanism to rotate to a locked position, each set of teeth of the locking-sliding mechanism to engage with a portion of the respective one of the two sets of rack teeth, and lock the angle of the stand cradle to the selected angle.

2. The adjustable stand of claim 1, wherein each locking-sliding mechanism is rotatably coupled to the respective one of the two ends of the handle by a cam rod of a respective one of the two rack tooth mechanisms.

3. The adjustable stand of claim 1, wherein each locking-sliding mechanism is rotatably coupled to the respective one of the two ends of the handle by a rotational direction transfer mechanism of a respective one of the two rack tooth mechanisms, each rotational direction transfer mechanism transfers rotations of the handle in a first plane to rotations of the respective locking-sliding mechanism in a second plane perpendicular to the first plane.

4. The adjustable stand of claim 3, wherein:
    each rotational direction transfer mechanism is further rotatably coupled to the respective one of the locking-sliding mechanisms and the respective one of the two ends of the handle by a coil spring of the rotational direction transfer mechanism; and
    when the handle is released, the coil spring causes the handle to rotate back to the retention position.

5. The adjustable stand of claim 3, wherein:
    each rotational direction transfer mechanism includes a first beveled gear and a second beveled gear rotatably coupled to the first beveled gear; and
    each rotational direction transfer mechanism transfers rotations of the handle in the first plane by the respective first beveled gear to rotations of the respective one of the locking-sliding mechanisms in the second plane by the respective second beveled gear.

6. The adjustable stand of claim 1, wherein:
    the stand cradle is rotatably coupled to the stand base by a first hinge proximate the bottom edge of the stand cradle; and
    when the stand cradle is rotated to the first rotational position, the stand cradle pivots around the first hinge.

7. The adjustable stand of claim 1, wherein:
    the stand arm is rotatably coupled to the stand base by a second hinge proximate the bottom edge of the stand arm; and
    when the stand cradle is rotated to the first rotational position, the stand arm pivots around the second hinge.

8. The adjustable stand of claim 7, wherein:
    the second hinge includes a coil spring to create a rotational tension force in an upward rotational direction; and
    when the angle of the stand cradle is being increased, the rotational tension force in the upward rotational direction reduces a load on the stand cradle.

9. The adjustable stand of claim 1, wherein:
the adjustable stand further comprises two slots, each slot coupled to the back side of the stand cradle proximate a respective one of the two sets of rack teeth;
the stand arm is movably coupled to the two slots proximate a top edge of the stand arm; and
when the stand cradle is rotated to the first rotational position, the top edge of the stand arm moves in the two slots in a linear direction parallel to the back side of the stand cradle.

10. The adjustable stand of claim 9, wherein when the stand cradle is rotated in an upward rotational direction, the linear direction of the top edge of the stand arm is an upward linear direction.

11. The adjustable stand of claim 9, wherein when the stand cradle is rotated in a downward rotational direction, the linear direction of the top edge of the stand arm is a downward linear direction.

12. The adjustable stand of claim 1, wherein:
each set of rack teeth includes a first set of angled teeth at a first angle and a second set of angled teeth at a second angle opposite the first angle;
the set of teeth of each locking-sliding mechanism includes a third set of angled teeth at the second angle and a fourth set of angled teeth at the first angle; and
when the handle is rotated to the retention position:
each third set of angled teeth engages with a portion of the first set of angled teeth of a respective one of the two sets of rack teeth; and
each fourth set of angled teeth engages with a portion of the second set of angled teeth of a respective one of the two sets of rack teeth.

13. The adjustable stand of claim 1, wherein, when the stand cradle is rotated in a downward rotational direction, the angle of the stand cradle with respect to the stand base is decreased.

14. The adjustable stand of claim 1, wherein, when the stand cradle is rotated in an upward rotational direction, the angle of the stand cradle with respect to the stand base is increased.

15. The adjustable stand of claim 1, wherein the plurality of angles range from a 0 degree angle to a 90 degree angle.

16. The adjustable stand of claim 1, wherein the plurality of angles vary by a fixed increment that is dependent on a pitch of the two sets of rack teeth.

17. An adjustable stand, comprising:
a stand base;
a stand cradle rotatably coupled to the stand base proximate a bottom edge of the stand cradle and a front edge of the stand base;
a stand arm rotatably coupled to the stand base proximate a bottom edge of the stand arm and a middle section of a top side of the stand base, and movably coupled to the stand cradle proximate two side edges of the stand cradle;
a handle rotatably coupled to the stand cradle proximate a top edge of the stand cradle;
a first set of rack teeth coupled to a back side of the stand cradle proximate a first side edge of the stand cradle;
a first locking-sliding mechanism including a first set of teeth; and
a first cam rod coupled to the first locking-sliding mechanism and rotatably coupled to a first end of the handle, the first cam rod configured to:
when the handle is rotated to an adjustment position, rotate to an unlocked position and cause the first set of teeth of the first locking-sliding mechanism to disengage from the first set of rack teeth;
when the handle is in the adjustment position and the stand cradle is forced in a rotational direction with respect to the stand base, set an angle of the stand cradle to a selected one of a plurality of angles at which the stand cradle can be set; and
when the handle is rotated to a retention position, rotate to a locked position and cause the first set of teeth of the first locking-sliding mechanism to engage with a portion of the first set of rack teeth to lock the angle of the stand cradle to the selected angle.

18. The adjustable stand of claim 17, further comprising:
a second set of rack teeth coupled to the back side of the stand cradle proximate a second side edge of the stand cradle;
a second locking-sliding mechanism including a second set of teeth; and
a second cam rod coupled to the second locking-sliding mechanism and rotatably coupled to a second end of the handle opposite the first end, the second cam rod to:
when the handle is rotated to a retention position, rotate to a locked position and cause the second set of teeth to engage with a portion of the second set of rack teeth to lock the angle of the stand cradle to the selected angle.

19. The adjustable stand of claim 17, wherein:
the first cam rod is rotatably coupled to the first end of the handle by a first rotational direction transfer mechanism of the first rack tooth mechanism; and
the first rotational direction transfer mechanism transfers rotations of the handle in a first plane to rotations of the first cam rod in a second plane perpendicular to the first plane.

20. The adjustable stand of claim 19, wherein:
the first rotational direction transfer mechanism is further rotatably coupled to the first cam rod and the first end of the handle by a coil spring of the rotational direction transfer mechanism; and
when the handle is released, the coil spring causes the handle to rotate back to the retention position.

\* \* \* \* \*